(No Model.)
T. J. JENNE & C. S. HARMON.
LIFTING JACK.
No. 254,823. Patented Mar. 14, 1882.
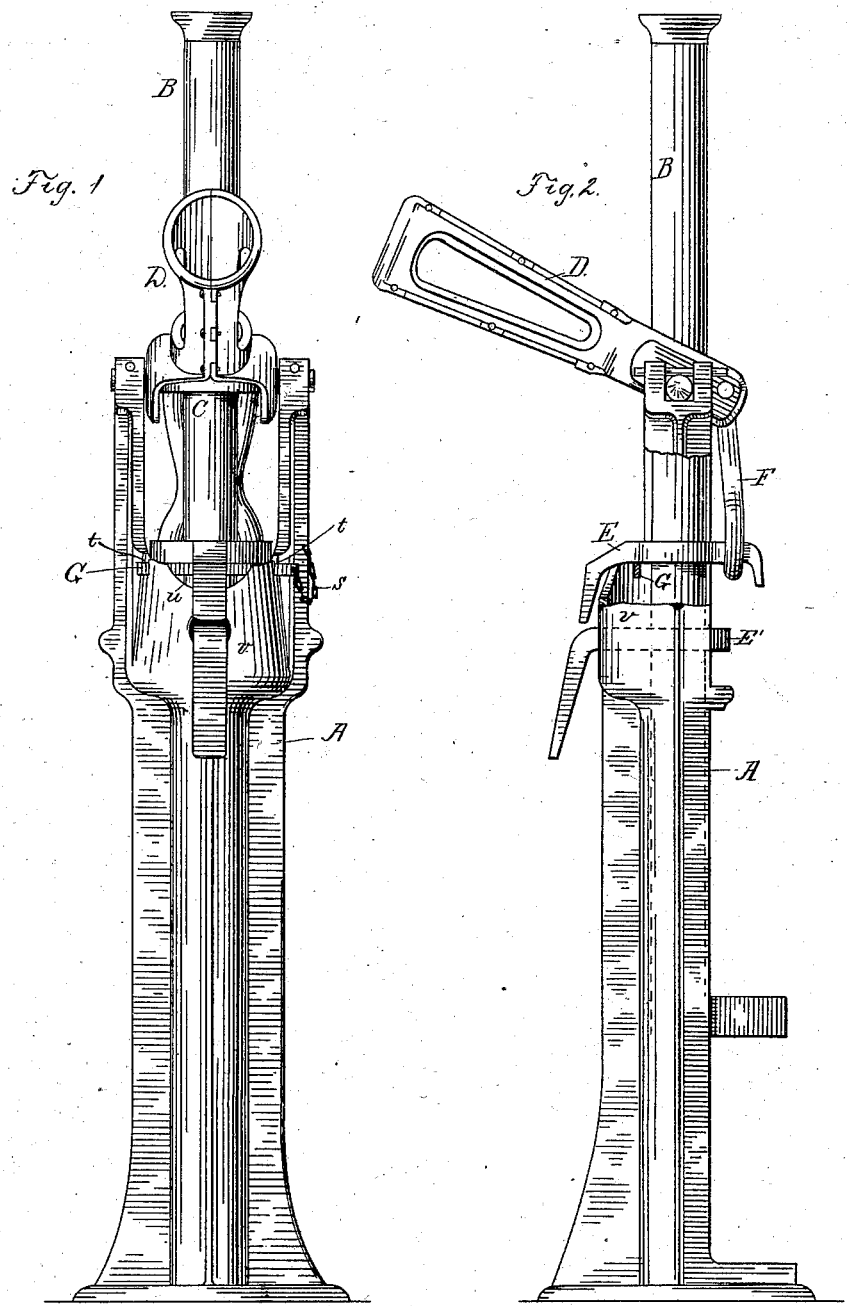

United States Patent Office.

THOMAS J. JENNE AND CHARLES S. HARMON, OF CHICAGO, ILLINOIS.

LIFTING-JACK.

SPECIFICATION forming part of Letters Patent No. 254,823, dated March 14, 1882.

Application filed July 29, 1881. (No model.)

*To all whom it may concern:*

Be it known that we, THOMAS J. JENNE and CHARLES S. HARMON, citizens of the United States, residing at Chicago, in the county of Cook and State of Illinois, have invented certain new and useful Improvements in Lifting-Jacks; and we do hereby declare the following to be a full, clear, and exact description thereof, reference being had to the accompanying drawings, of which—

Figure 1 is a rear elevation of our device, and Fig. 2 a side elevation of the same with a small portion broken away more clearly to illustrate our improvement.

Our present invention relates to an improvement on the lifting-jack for which an application for a patent was made by us as joint inventors on the 17th day of January, 1881, and allowed by the Patent Office on the 15th day of June, 1881.

All the leading features of our present device are substantially the same as in our former device above referred to, and hence the detailed description of them given in the aforesaid application need not be repeated here. It will be sufficient for our present purpose to say that the device comprises a standard, A, having its upper part bifurcated, a lifting-bar, B, sliding vertically in guides in the said standard, and provided with a foot projecting outward, a collar, C, surrounding the said bar and journaled to the upper end of the forked arms of the standard, a lever, D, of which the trunnions of the collar C form the fulcrum, and two annular friction-pawls, E and E', upon the said bar, the upper pawl, E, being connected to the short arm of the lever by a clevis, F, and being free to slide upon the bar to the extent, or nearly so, of the sweep of the short arm of the lever, whereas the lower pawl, E', is restrained from moving either up or down more than is necessary to give it the required looseness.

Each pawl is provided at its rear side with a thumb-piece, to permit its gripe upon the lifting-bar to be loosened at the will of the operator. The openings through the pawls E and E' are larger than the bar B, which passes through them, and are both oblique, but inclined in contrary directions with respect to each other when the pawls are in position, whereby they operate to gripe the bar alternately, the upper one to raise it by means of the clevis and lever, and the lower one to retain it while the upper one is being lowered for a fresh gripe.

Our former device is constructed with a view to having the bar B descend suddenly after doing its work of lifting. Therefore it is so arranged that the lifting of the handle above a given height invariably brings the upper pawl in contact with a stationary stop, the effect of which is to tilt it and to loosen its gripe upon the bar. This done, (the gripe of the lower pawl having previously been loosened by tilting it by means of the thumb-piece,) the bar descends. With our former device the bar may also be caused to descend gradually instead of suddenly; but, as stated in our former specification, it is necessary for this purpose to use great care that the handle be not lifted high enough to bring the upper pawl in contact with the stop. Thus in inexperienced hands the device as formerly constructed may drop suddenly at the wrong time and be productive of undesirable results.

The object of our present invention is to overcome this defect by so constructing the device that the bar may, if desired, be caused to descend gradually without the exercise of any particular caution on the part of the operator; and to this end our invention consists in providing the standard, just above the lowest point reached by the upper pawl in its vertical movement, with a removable stop, in place of the fixed stop described in our former application, all as hereinafter more fully set forth.

The drawings represent one mode of carrying out our invention.

It will be seen that the plate v at the rear of the standard, forming the stop in our former device, is cut away, as shown at u, thus bringing it wholly out of reach of the pawl. The plate v is curved, and is provided, close to the arms of the standard, with notches t, to receive the bar G, which, when in position, constitutes the stop.

It is desirable to attach the bar G to the standard by means of a chain, s, as shown, to prevent its becoming lost or mislaid. When sudden descent is desired the bar G is inserted in the notches $t$, when the device is to all intents the same as our former one. When, however, gradual descent is desired the bar G is left out or removed, when the upper pawl, meeting no obstruction in its downward course, continues its gripe upon the bar until it is loosened by the hand of the operator.

We do not limit ourselves to the particular form of stop shown and above described, as many other forms might be adopted—as, for example, a bolt passing horizontally through holes or standing in a vertical socket in the upper edge of the plate $v$—any removable stop in a proper situation to accomplish the above ends being within the spirit of our invention.

What we claim as new, and desire to secure by Letters Patent, is—

1. In a lifting-jack substantially as described, a removable stop for the sliding pawl, as and for the purpose set forth.

2. In a lifting-jack comprising a standard, A, lifting-bar B, pivoted lever D, friction-pawls E and E′, and clevis F, constructed and operating substantially as described, a removable stop at the rear of the said standard, below the upper pawl, as and for the purpose set forth.

3. In a lifting-jack, the combination of the standard A, having its upper part forked and provided with a plate, $v$, recessed, as shown at $u$, and having notches $t$, lifting-bar B, sliding vertically in guides on the said standard, collar C, journaled to the top of the standard and surrounding the bar B, lever D, having the trunnions of the collar C for a fulcrum, friction-pawls E and E′ upon the bar B, clevis F, connecting the short arm of the lever with the upper pawl, and bar G, adapted to fit the notches $t$, substantially as described.

THOMAS J. JENNE.
CHARLES S. HARMON.

In presence of—
  GEO. W. SLAUFORD,
  EDWIN B. SMITH.